United States Patent [19]

Kirk

[11] Patent Number: 5,133,292
[45] Date of Patent: Jul. 28, 1992

[54] DISPENSING DEVICE

[75] Inventor: Christopher P. Kirk, Sunbury-on-Thames, England

[73] Assignee: Pet Mate Limited, Shepperton, United Kingdom

[21] Appl. No.: 639,235

[22] Filed: Jan. 9, 1991

[30] Foreign Application Priority Data

Jan. 20, 1990 [GB] United Kingdom ............... 9001352

[51] Int. Cl.$^5$ ............................................. A01K 61/02
[52] U.S. Cl. ............................ 119/51.04; 119/51.13; 222/370; 222/190
[58] Field of Search ............... 119/51.04, 51.11, 51.12, 119/51.13, 56.1, 56.2; 222/152, 168.5, 190, 354, 367, 370, 650

[56] References Cited

U.S. PATENT DOCUMENTS

| | | | |
|---|---|---|---|
| 2,858,799 | 11/1958 | Krauss et al. | 119/5 |
| 2,901,150 | 8/1959 | Matter | 222/370 |
| 3,050,029 | 8/1962 | Appleton | 119/51.13 |
| 3,688,744 | 9/1972 | Kaplan | 119/51.11 |
| 3,738,328 | 6/1973 | Hoday et al. | 119/51.13 |
| 3,741,162 | 6/1973 | Lopez | 119/51.13 |
| 4,249,483 | 2/1981 | Sobky | 119/51.12 |
| 4,492,183 | 1/1985 | Chiotasso et al. | 119/51.13 |
| 4,585,112 | 4/1986 | Peeling et al. | 119/51.13 |
| 4,981,106 | 1/1991 | Nagatomo | 119/51.11 |

FOREIGN PATENT DOCUMENTS

| | | | |
|---|---|---|---|
| 2814186 | 10/1979 | Fed. Rep. of Germany | 119/51.13 |
| 2932762 | 2/1981 | Fed. Rep. of Germany | 119/51.04 |
| 752132 | 7/1956 | United Kingdom . | |
| 952763 | 3/1964 | United Kingdom . | |

Primary Examiner—Robert P. Swiatek
Assistant Examiner—Todd E. Manahan
Attorney, Agent, or Firm—Young & Thompson

[57] ABSTRACT

In a dispensing device for automatically feeding fish a base 11 has mounted on its upper surface 14 a drive member 23 constantly rotated by a small, highly geared battery powered stepping motor controlled by a quartz controlled electronic circuit mounted within the base. A ring 15 of compartments freely rotatable on the surface 14 within location ribs 16 of the base has on its inner periphery 18 spaced ribs 26 one of which will be engaged by a pawl 25 or 25' of the drive member 23 during each revolution of the drive member, whereby the ring 15 is periodically arcuately displaced. The compartments of the ring 15 are open at top and bottom and in their path is an aperture 20 through the base. The compartments of the ring 15 are brought successively into alignment with the aperture 20 so that fish food located in the compartments is discharged by gravity through the aperture 20. Each pawl 25,25' is removably pegged into a selected one of eight holes 35 distributed circumferentially of the top of the drive member 23 so that the times when the ring 15 will be displaced during each revolution of the drive member 23 can be selected.

14 Claims, 4 Drawing Sheets

DISPENSING DEVICE

FIELD OF THE INVENTION

This invention relates to a dispensing device which is particularly, although not exclusively, suitable as an automatic fish feeder.

BACKGROUND OF THE INVENTION

Owners of domestic aquariums are aware of the problem that fish should be fed controlled amounts of food at regular intervals but it is not always easy to ensure that this is done manually at the correct times, especially if there is no-one in attendance. Various proposals have been made in the past for devices which will carry out this task automatically but none is wholly satisfactory in terms of manufacturing cost or reliability of operation.

OBJECT OF THE INVENTION

A principal object of the present invention is to improve upon previous proposals and in particular to permit a reliable, low cost device to be provided which can take advantage of a highly geared, battery powered stepping motor controlled by a quartz controlled electronic circuit of the kind which has become commercially available in recent years.

Another object is to provide such a device which may be made so compact and of such light weight that it may be mounted without any modification on virtually any domestic aquarium.

SUMMARY OF THE INVENTION

In accordance with the present invention there is provided a dispensing device comprising a base member, an aperture in the base member, a ring of compartments each open at top and bottom, means locating the ring on the base to be relatively rotatable about an upright axis such that the compartments will pass successively over the aperture, a plurality of abutments spaced circumferentially around the inner periphery of the ring and means for driving the ring in rotation, said drive means comprising a drive member of smaller diameter than the ring and located on the base too be rotatable about an axis within and eccentric with respect to the ring, the drive member having at least one peripheral abutment which during a revolution of the drive member will encounter one of the abutments of the ring, thereby to displace the ring such that a different one of the compartments is substantially aligned with the aperture.

Means is preferably provided for adjusting the position of said abutment of the drive member circumferentially of the latter. Said abutment of the drive member may be removable therefrom and may be optionally positionable at different locations around the periphery of the drive member. The said abutment of the drive member may comprise a removable pawl having a peg which can be fitted in a selected one of a plurality of holes distributed circumferentially of the drive member. The drive member may be provided with more than one removable pawl.

The compartments are preferably defined by inner and outer concentric walls and radial dividing walls, and each said dividing wall may have along its lower edge a generally wedge-shaped formation projecting from the wall in the direction in which the ring is driven in rotation by the drive member, in use, said formation tending to prevent material being pushed by said wall over the upper surface of the base member from passing under said wall.

The drive member is preferably constantly driven in rotation by a prime mover via a transmission which includes means whereby the orientation of the drive member relative to the prime mover may be manually altered to alter the time or times when the ring will be displaced by the drive member.

Preferably the base member has a lid of transparent material which can be brought to cover and enclose the ring and drive member without interference with the ability of the ring and drive member to rotate.

The base member is preferably hollow and the aperture of the base member is preferably formed by the upper opening of a tube which extends through the base member and opens downwardly.

When the device is in the form of an automatic feeding device for fish an underside of the base member may be provided with suction holding means to facilitate mounting the device above the water in an aquarium.

BRIEF DESCRIPTION OF THE DRAWINGS

A preferred embodiment of the invention will now be described by way of non-limitative example with reference to the accompanying drawings, in which.

DESCRIPTION OF THE PREFERRED EMBODIMENT

Figure 1:
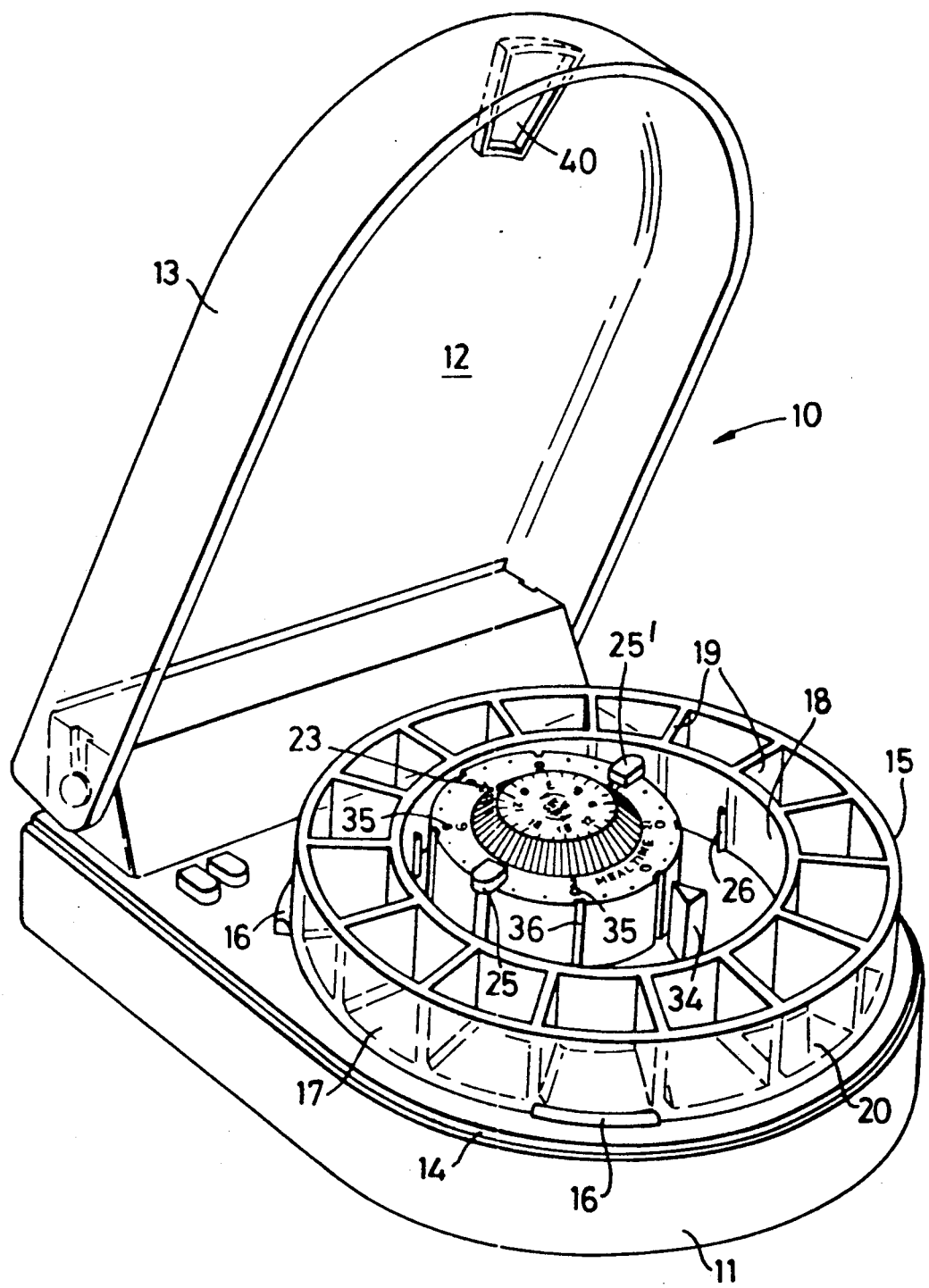
FIG. 1 is a perspective view from above of an automatic fish feeding device in accordance with the invention.
Figure 5:
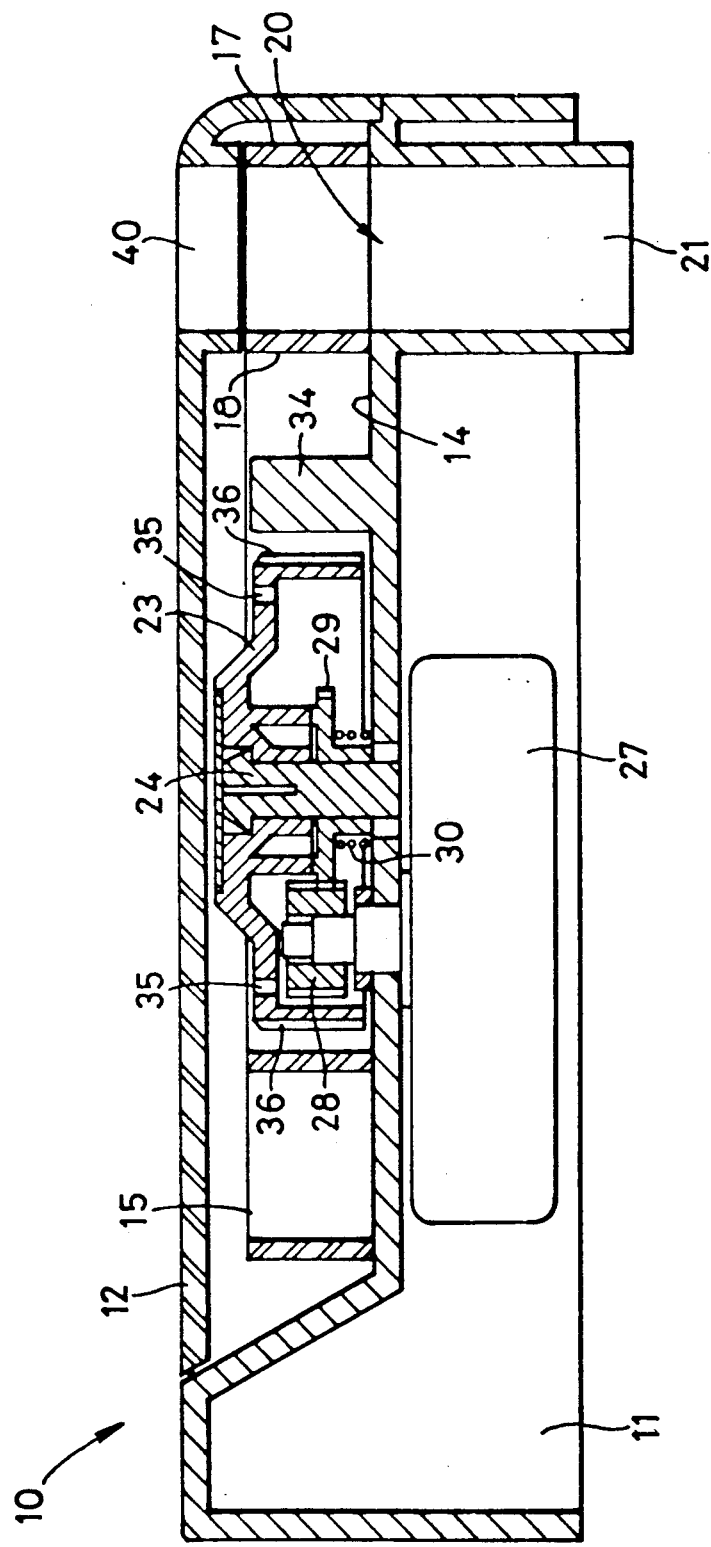
FIG. 5 is a sectional elevation taken on the line V—V of FIG. 2, FIGS. 6A and 6B are respectively a side elevation and an underplan view, again on an enlarged scale, of one of the removable pawls of the device.

The automatic fish-food dispensing device 10 illustrated comprises a hollow base 11 at the rear of which there is pivoted about a horizontal axis a lid 12 which may be brought down from the open position shown in FIG. 1 to a closed position shown in FIG. 5 in which a peripheral wall 13 of the lid seats on a rebate 14 of the base so as to cover and enclose the working components above the base. Preferably the lid 12 is of a transparent plastics material so that when closed the user can see through it.

On top of the upper surface 14 of the base is a ring-shaped upper member 15. This is rotatable relative to the base about its central, vertical axis but it is not pivoted at its centre to the base. Instead location means in the form of four arcuate ribs 16 upstand from the upper surface 14 of the base at equi-angular intervals around the outer periphery of the ring 15 to restrain it against lateral movement while permitting it to rotate. The ring 15 comprises an arcuate array of compartments—fifteen in the example shown—each defined by outer and inner circumferential walls 17 and 18 of the ring and an adjacent pair of radial dividing walls 19. The ring 15 has no top or bottom and therefore each compartment is open both at its top and bottom.

The upper surface 14 of the base has an aperture 20 lying in the circular path of the compartments as the ring 15 rotates. Preferably, and as shown, the aperture 20 is of the same trapezoid shape as each compartment. As shown in FIG. 5, the aperture 20 is the upper orifice of a vertical tube 21 which extends through the hollow base 11 and opens downwardly at a position slightly below the base. The effect of this arrangement is as follows. If particulate material such as fish food is placed in a compartment it will remain therein until the compartment is aligned with the aperture 20 because the underside of the ring 15 is in sliding contact with the upper surface 14 of the base, which therefore acts as a "false bottom" for each compartment except any currently aligned with the aperture 20. To prevent any tendency for particulate material to pass below a radial wall 19 of the ring 15 by which it is being pushed over the surface 14 of the base, thus lifting the ring 15 or causing it to jam, the bottom edge of each wall 19 has a wedge-shaped projection 22 (see FIG. 3) extending in the intended direction of rotation of the wall, which is opposite to that indicated by the arrow A in FIG. 2 (i.e. counter clockwise as viewed).

Figure 4:
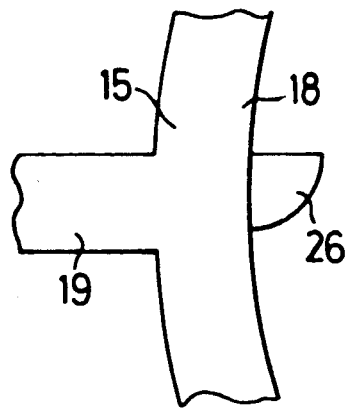
FIG. 4 is another detail on an enlarged scale of the encircled area indicated at "4" in FIG. 2.
Figure 6A:
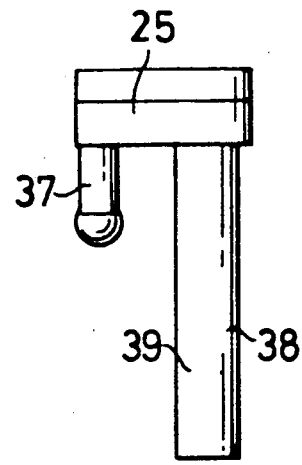
Figure 6B:
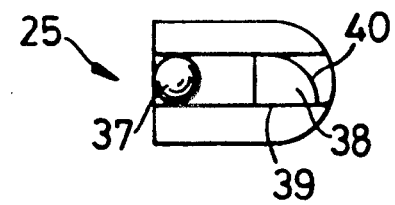
Figure 7:
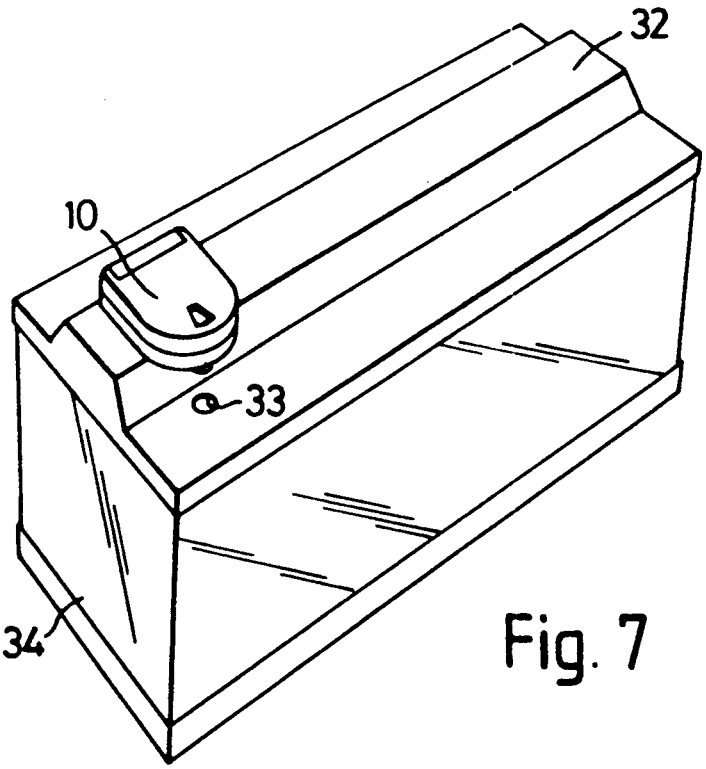
FIG. 7 shows the device in position on an aquarium.

The ring of compartments 15 is periodically rotated by a drive member 23 rotatable about a pivot shaft 24 upstanding from the base 11 at a position within the eccentric with respect to the ring 15. At equal angular intervals around the inner periphery of the inner wall 18 of the ring 15 radially inwardly-projecting abutments in the form of fixed pawls 26 are provided. One of these is shown on an enlarged scale in FIG. 4. In the upper surface of the drive member 23 is an array of eight equi-angularly spaced holes 35. Each of these is radially aligned with and equidistant from a respective recess 36 in the periphery of the drive member, each recess being generally of rectangular cross section. FIGS. 6A and 6B show on an enlarged scale one of two similar removable pawl members 25,25'. Each removable pawl member 25,25' comprises a peg 37 and, parallel therewith, a longer leg 38 which has a flat face 39 presented in one direction and a curved face 40 (FIG. 6B) presented in the opposite direction. The dimensions of the removable pawl members 25,25' are such that when a peg 37 is inserted in a chosen hole 35 the associated leg 38 will seat in the associated recess 36 so that the leg 38 will project radially from the periphery of the drive member 23 but will not be displaceable circumferentially of the drive member. When so positioned each removable pawl member 25,25' will, during a complete revolution of the drive member 23, encounter one of the fixed pawls 26, thus displacing the ring of compartments 15. However arcuate displacement of the ring 15 will occur only so long as the removable pawl 25 or 25' remains in contact with said fixed pawl 26. In the embodiment illustrated the diameter of the drive member 23 is so chosen relative to the diameter of the ring 15 that the arcuate displacement of the ring which will occur when a removable pawl 25,25' is in contact with a fixed pawl 26 corresponds with the arcuate extent of each compartment. Thus if, at commencement, one of the compartments of the ring 15 is aligned with the aperture 20 then during successive complete revolutions of the drive member 23 each of the other compartments will be brought successively into alignment with the aperture 20, but arcuate displacement of the ring 15 will have a periodicity determined by the intervals during which neither of the removable pawls 25,25' is in contact with any fixed pawl 26.

As shown in FIG. 5 an electric motor 27 mounted within the hollow base 11 (together with one or more battery for powering it) constantly drives a gear 28 which in turn drives a larger gear 29. The motor is a small, highly geared battery powered stepping motor controlled by a quartz controlled electronic circuit as currently used in clock mechanisms. The gear 28 engages the underside of the hub-shaped drive member 23 over a ratchet mechanism (not shown) allowing the drive member 23 to be turned manually clockwise in the direction of arrow A in FIG. 2 but preventing it from being turned anti-clockwise relative to gear 28. A spring 30 in compression between the upper surface 14 of the base and the underside of the gear 29, which is commonly mounted on the pivot shaft 24 with the drive member 23 for independent, coaxial rotation, normally holds the ratchet teeth in engagement. Thus the drive member 23 normally rotates with the gear 29 but its angular orientation relative to gear 29 can be varied by rotating the drive member 23 clockwise by hand. In the embodiment illustrated the speed of the motor and the ratio of the gear train in such that the drive member 23 will complete one revolution every 24 hours.

In use of the device illustrated the user loads an appropriate number of the compartments of the ring 15 with fish food, gaining access by lifting the lid 12. If the motor 27 is running the inner ring of numbers on top of the drive member 23 should indicate current time by alignment with a fixed pointer 34 upstanding from base 11. If this "clock" is not correct it is re-set by rotating drive member 23 manually in the direction of arrow A until current time is indicated. The user then decides at what interval or intervals within 24 hours of present time he wishes the device to dispense a meal and inserts the peg 37 of a removable pawl in the appropriate hole 35. In the example illustrated current time is just after 11 am and the two removable pawls 25,25' have been positioned so that a first meal will be dispensed at 6 pm that evening and a second meal at 6 am the following morning. Of course he ensures that at least the two compartments of ring 15 nearest aperture 20 (in the direction counter to arrow A) contain food.

As shown in FIG. 6 the device 10 is located on the cover 32 of a fish tank 31 with the tube 21 above and aligned with a hole 33 in the cover. To facilitate this and prevent the device 10 moving the base 11 may be provided on its underside with suction-cup feed (not shown) to engage the cover 32.

Because the ring 15 is freely rotatable there is a possibility that when a removable pawl 25,25' moves out of contact with a fixed pawl 26 which it has been displacing a compartment of the ring may not be exactly aligned with the aperture 20. This regarded as unimportant because if a major part of a compartment is exposed to the aperture 20 its contents will fall out. On the other hand, because of the particulate nature of fish food if a minor part of an adjacent component is also exposed to the aperture 20 its content will not fall out. It is envisaged however that in applications of the device where this might be regarded a drawback a detent mechanism (not shown) may be provided to ensure that whenever released by the pawl 25 the ring 15 will adopt an angular orientation such that a compartment is fully aligned with the aperture 20.

The transparent lid 12 is formed with an internal formation 40 generally of the same shape as one of the compartments of ring 15 and positioned so that when the lid is closed it will align with the opening 20. This serves at least partially to isolate the interior of the device from air ingress through the tube 21. In a modification not shown the formation 40 may be an aperture in lid 12 through which fish in an aquarium can be fed manually at any time without having to dismount the device or even open its lid 12.

Figure 2:
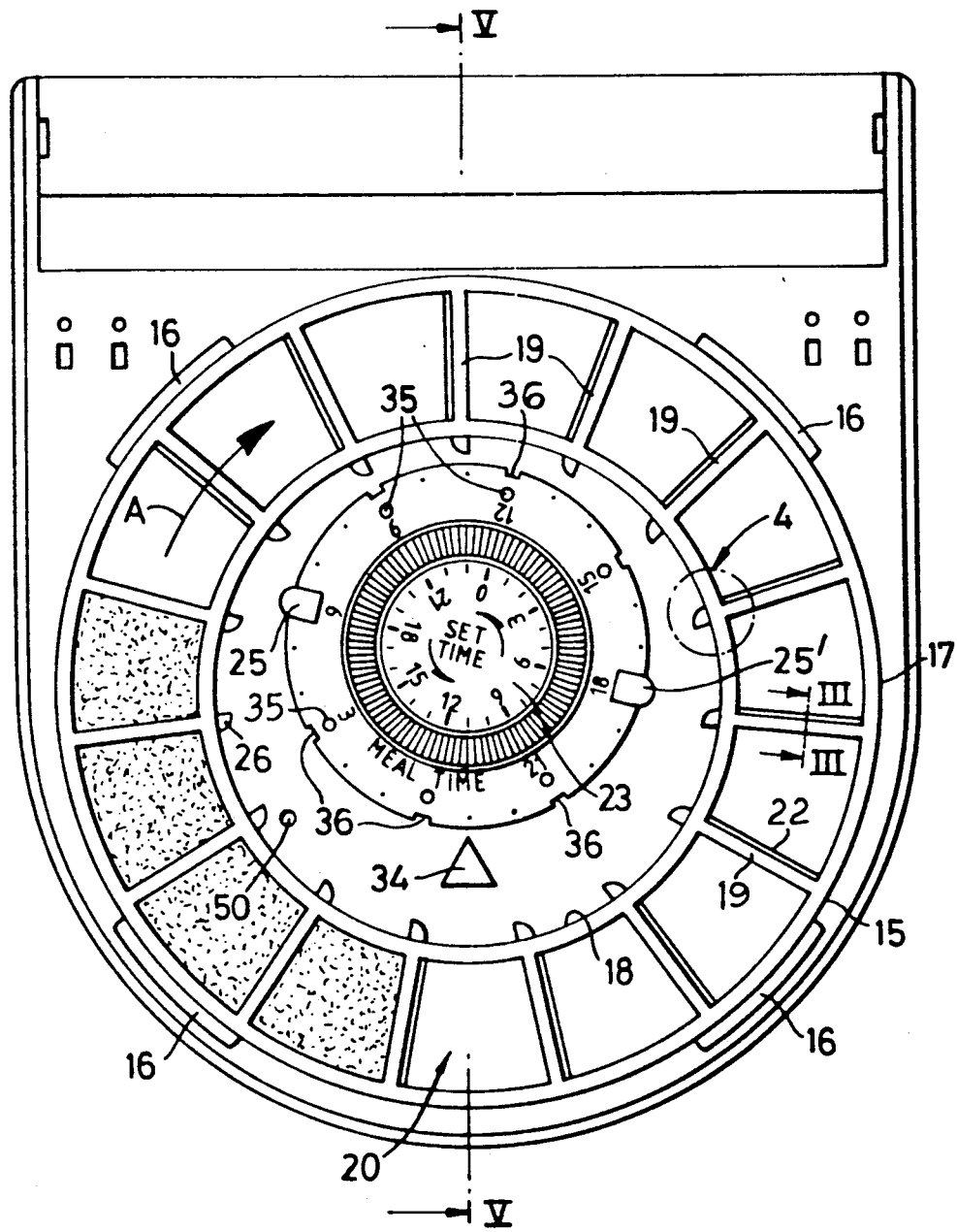
FIG. 2 is a plan view of the device of FIG. 1 showing fish food in some of its compartments.
Figure 3:
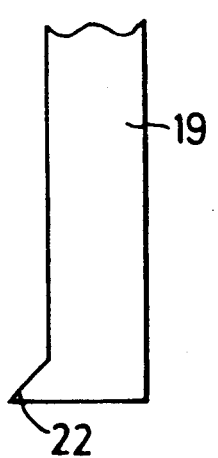
FIG. 3 is a detail on an enlarged scale taken on the line III—III of FIG. 2.

Illustrated at 50 in FIG. 2 is an opening in surface 14 of the base which may be connected by a branch line (not shown) to the output side of the pump (not shown) used for aeration of the aquarium. By maintaining a slight excess air pressure in the interior of the device in this way the contents can be protected from humid ambient air.

It will be evident that in modifications of the illustrated embodiment the drive member 23 may have a period of rotation of more or less than 24 hours and that more or less removable pawls 25 may be provided to obtain actuation at chosen intervals of time. Moreover it is not essential that any or all of the pawls on drive member 23 should be removable. Any may be replaced by a pawl having a fixed position relative to the drive member 23.

What is claimed is:

1. A dispensing device comprising a base member, an aperture in the base member, a ring of compartments each open at top and bottom and separated by dividing walls lying substantially in radial planes of the ring, means locating the ring on the base to be relatively rotatable about an upright axis devoid of upper axial bearing such that the compartments will pass successively over the aperture, a plurality of abutments spaced circumferentially around the inner periphery of the ring and means comprising a low powered electromechanical source of substantially constant rotary motion for driving the ring in rotation, said drive means further comprising a drive member of smaller diameter than the ring and located on the base to be rotatable about an axis within and eccentric with respect to the ring, the drive member having at least one peripheral abutment which during a revolution of the drive member will encounter one of the abutments of the ring, thereby progressively to displace the ring such that a different one of the compartments is substantially aligned with the aperture, the arrangement being such that while the ring is being progressively displaced by the drive means an open bottom of one of said compartment will move progressively toward alignment with the aperture such that particulate contents of the said compartment will tend to be discharged incrementally over time, each dividing wall having along its lower edge a generally wedge-shaped formation projecting from the dividing wall in the direction in which the ring is driven in rotation by the drive member, in use, said formation tending to prevent material being pushed by said dividing wall over the upper surface of the base member from passing under said dividing wall.

2. A dispensing device as claimed in claim 1 wherein means is provided for adjusting the position of said abutment of the drive member circumferentially of the latter.

3. A dispensing device as claimed in claim 2, wherein said at least one abutment of the drive member is removable therefrom and is optionally positionable at different locations around the periphery of the drive member.

4. A dispensing device as claimed in claim 3, wherein said at least one abutment of the drive member comprises a removable pawl having a peg which can be fitted in a selected one of a plurality of holes distributed circumferentially of the drive member.

5. A dispensing device as claimed in claim 4, wherein the drive member is provided with more than one removable pawl.

6. A dispensing device as claimed in claim 1, wherein the drive member is constantly driven in rotation by said electromechanical source via a transmission which includes means whereby the orientation of the drive member relative to the electromechanical source may be manually altered to alter the time or times when the ring will be displaced by the drive member.

7. A dispensing device as claimed in claim 6, wherein the electromechanical source is a small, highly geared battery powered stepping motor controlled by a quartz controlled electronic circuit.

8. A dispensing device as claimed in claim 1, wherein the base member has a lid of transparent material which can be brought to cover and enclose the ring and drive member without interference with the ability of the ring and drive member to rotate.

9. A dispensing device as claimed in claim 1, wherein the base member is hollow and the aperture of the base member is formed by the upper opening of a tube which extends through the base member and opens downwardly.

10. A dispensing device as claimed in claim 1 and comprising means for connecting the interior of the device to the output side of an air pump.

11. A dispensing device as claimed in claim 1, wherein the cover is hinged to the base along straight sides of the base and cover.

12. A dispensing device as claimed in claim 1, wherein said location means extends upwardly from the base at a position spaced inwardly from the periphery of the base to a height which is lower than that of the periphery of the ring.

13. A dispensing device as claimed in claim 12, wherein the location means comprises a plurality of ribs on the base spaced circumferentially around the ring.

14. A dispensing device comprising a base member, an aperture in the base member, a ring of compartments each open at top and bottom, means locating the ring on the base to be relatively rotatable about an upright axis such that the compartments will pass successively over the aperture, a plurality of abutments spaced circumferentially around the inner periphery of the ring and means for driving the ring in rotation, said drive means comprising a drive member of smaller diameter than the ring and located on the base to be rotatable about an axis within and eccentric with respect to the ring, the drive member having at least one peripheral abutment which during a revolution of the drive member will encounter one of the abutments of the ring, thereby to displace the ring such that a different one of the compartments is substantially aligned with the aperture, the compartments being defined by inner and outer concentric walls and radial dividing walls, and each dividing wall having along its lower edge a generally wedge-shaped formation projecting from the dividing wall in the direction in which the ring is driven in rotation by the drive member, in use, said formation tending to prevent material being pushed by said dividing wall over the upper surface of the base member from passing under said dividing wall.

* * * * *